Sept. 23, 1969   J. CARNAZZA   3,469,158
TRIMMER CAPACITOR
Filed Nov. 20, 1967   3 Sheets-Sheet 1
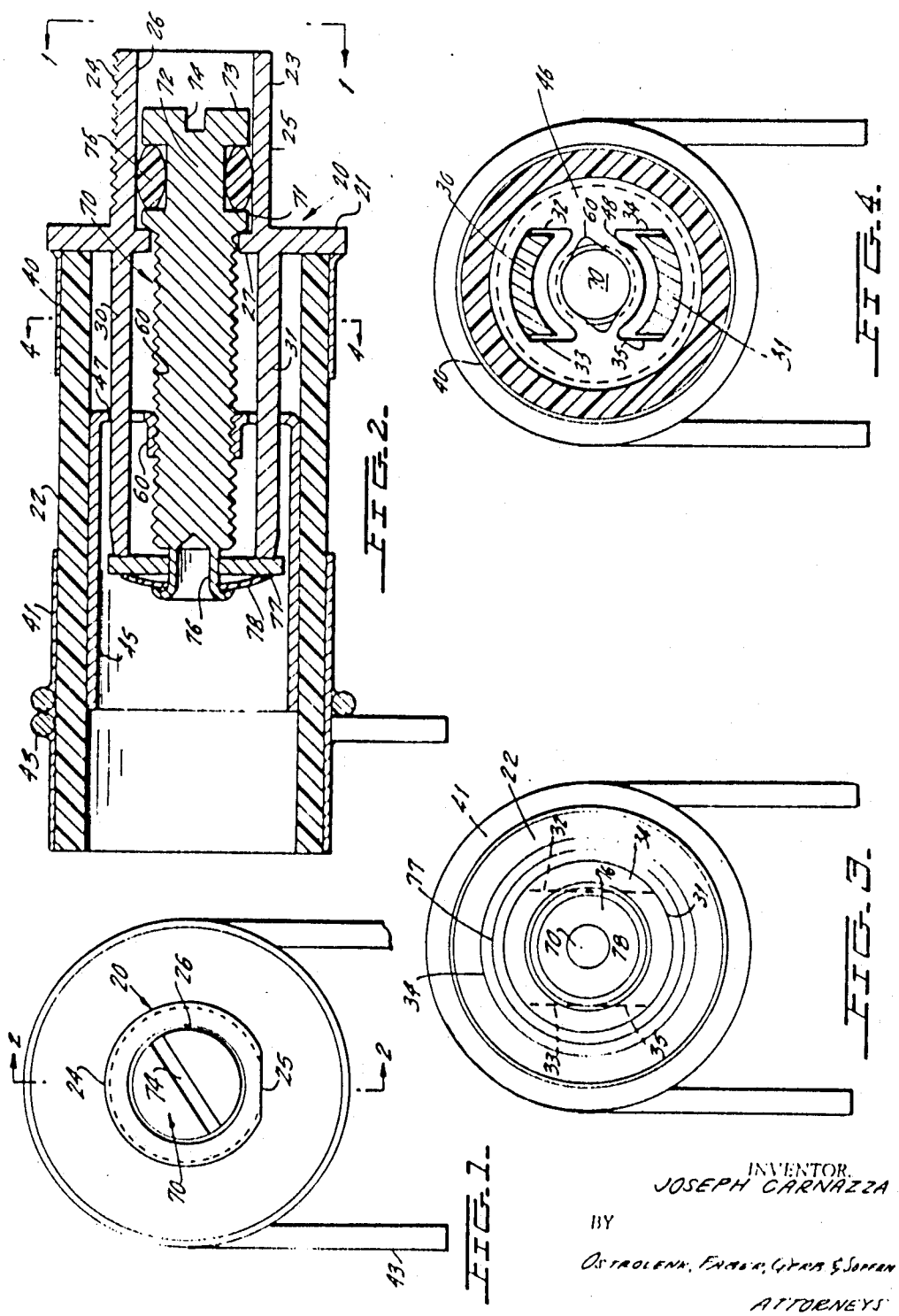
INVENTOR.
JOSEPH CARNAZZA
BY
Ostrolenk, Faber, Gerb & Soffen
ATTORNEYS

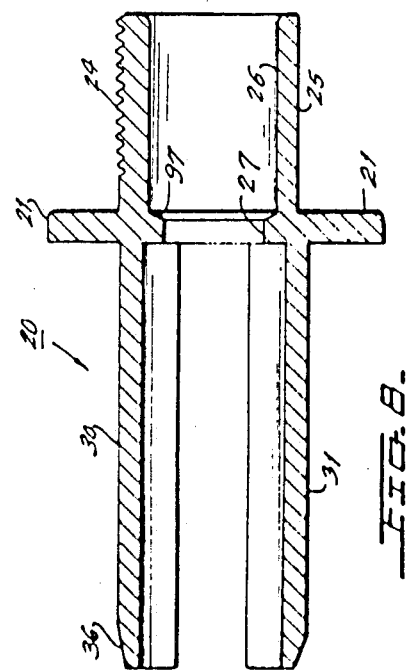
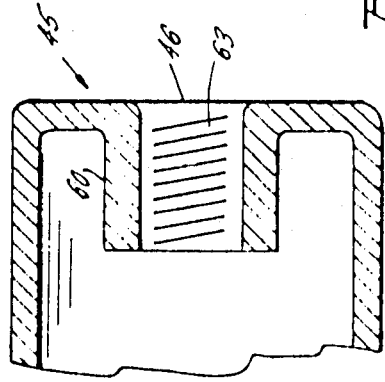
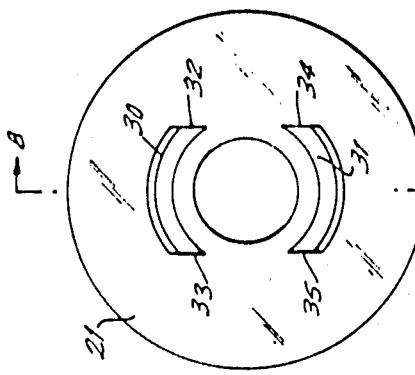
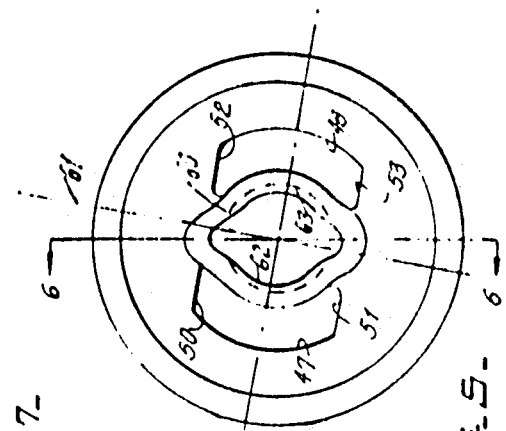

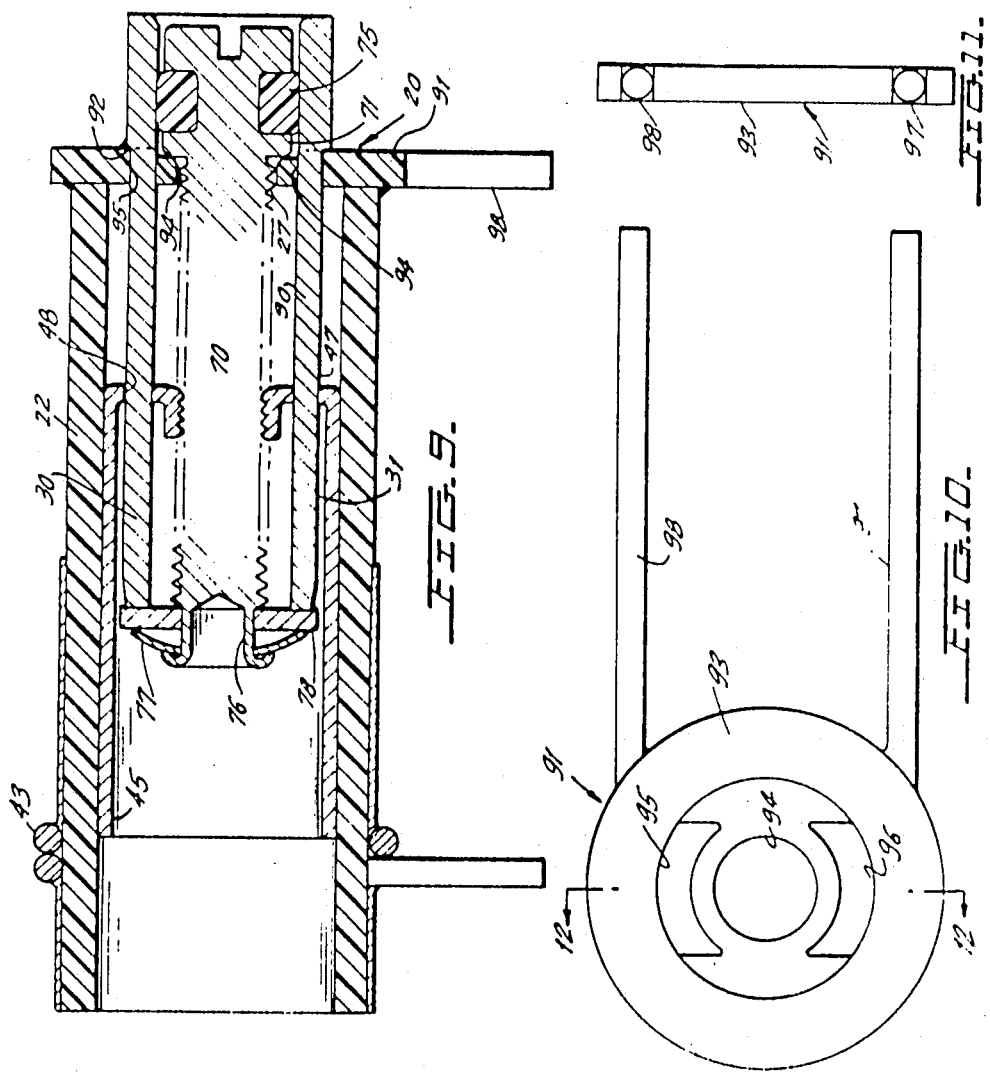

United States Patent Office 3,469,158
Patented Sept. 23, 1969

3,469,158
TRIMMER CAPACITOR
Joseph Carnazza, Brooklyn, N.Y., assignor, by mesne assignments, to JFD Electronics Corporation, Brooklyn, N.Y., a corporation of Delaware
Filed Nov. 20, 1967, Ser. No. 684,144
Int. Cl. H01g 5/16
U.S. Cl. 317—249                                       3 Claims

ABSTRACT OF THE DISCLOSURE

A trimmer capacitor has an axially movable nonrotating piston in which the end of the piston is inwardly formed with an oval tube which is interiorly threaded to receive a rotating adjustment screw. Two opposing arcuate slots are formed in the piston having parallel, straight edges for receiving guide rails extending from the support bushing to prevent piston rotation.

---

This invention relates to a piston trimmer capacitor having a nonrotating axially movable piston, and more specifically relates to a nonrotating piston trimmer capacitor having an improved bushing structure including means for supporting an adjustment screw.

This invention is an improvement of the structure shown in copending application Ser. No. 183,512, filed Mar. 29, 1962, in the name of Hugo Seiden, entitled "Direct Travel Mechanism," and assigned to the assignee of the present invention, now U.S. Patent No. 3,360,697, and is related to copending application Ser. No. 684,398, filed Nov. 20, 1967, in the name of Carnazza and Weisbrod, entitled "Improved Piston Structure for Non-Rotating Piston Trimmer Capacitor," and is also assigned to the assignee of the present invention.

In the above-noted application Ser. No. 183,512, the bushing structure, which is the main support body for the capacitor, is comprised of an enlarged head portion which receives a dielectric tube formed on one of its surfaces, and has an opening therein for capturing a rotating adjustment screw. The bushing is also provided with a projecting tubular form which extends interiorly of the dielectric form, and which slidably mounts the piston which serves as the movable electrode of the capacitor.

In order to prevent piston rotation with rotation of the adjustment screw, the cylindrical extension has a slot formed therein and the bottom of the piston has a conforming elongated slot which receives the major and unslotted portion of the cylinder. The adjustment screw is then threaded to a suitable threaded connection which is also located at the base of the cylinder so that the adjustment screw (which is captured against axial movement) is rotated, the piston will necessarily traverse along the screw without rotation. The principal guiding of the piston against rotation in this type structure is obtained along the full engagement between the full slot in the piston bottom and the major portion of the slotted cylindrical extension in the bushing. Thus, close tolerances are necessary between the piston slot and the slotted cylindrical extension. Moreover, any slight rotary motion of the piston due to play between the slots and extension legs will degrade the performance of the capacitor.

In accordance with an important feature of the invention, a bushing structure, similar to that provided in the above-noted application Ser. No. 183,512, is used where, however, instead of a thin slot in the cylindrical extension, the extension is straddle-milled on its opposing surfaces to remove approximately two opposing 90° sections of the cylinder leaving cylindrical guide posts, each occupying approximately 90° of arc. Moreover, the straddle-milling operation causes the edges of the remaining guide posts to be flat and parallel. A corresponding slot, which may have a greater radial width, is then formed in the piston, with close engagement between the piston and the slot being along the parallel slot and guide rail edges. Thus, a greater tolerance is permitted in the manufacturing operation in regard to the shape of the major portion of the slot, and of the major portion of the extending guide rails.

As a further feature of the invention, this type of bushing may be formed of two separate members, particularly for miniaturized structures, wherein the major body of the bushing and its integrally extending guide rails is formed of a generally cylindrical member having a simple and easily machined shape, while the enlarged flange for receiving the bushing and for receiving a portion of the adjustment screw is formed of a simple washer. In either version, the guide screw free end is connected to the free end of the guide rails by a spring washer compressed against a low-friction metal washer resting on the guide rail end faces with the arrangement secured by rolling over the hollow end of the adjustment screw.

Accordingly, a primary object of this invention is to provide a novel bushing and support structure for piston trimmer capacitors having a non-rotating piston which lends itself to simplified manufacturing techniques and is less expensive than similar existing devices.

Another object of this invention is to provide a novel method of manufacture of extending guide sections of the bushing of a nonrotating piston trimmer capacitor.

A further object of this invention is to provide a novel, simple and inexpensive means for supporting the adjustment screw of a nonrotating piston trimmer capacitor in the main support bushing.

Still a further object of this invention is to provide a novel bushing structure for miniaturized piston trimmer capacitors which is composed of two easily formed components.

Yet another object of this invention is to reduce the necessary manufacturing precision for high accuracy piston trimmer capacitors having a nonrotating piston.

These and other objects of this invention will become apparent from the following description when taken in connection with the drawings in which:

FIGURE 1 is a front view of a first form of a piston trimmer capacitor constructed in accordance with the present invention.

FIGURE 2 is a cross-sectional view of FIGURE 1 taken across the section line 2—2 in FIGURE 1.

FIGURE 3 is a plan view of the left-hand end of the trimmer capacitor of FIGURE 2.

FIGURE 4 is a cross-sectional view of FIGURE 2 taken across the section line 4—4 in FIGURE 2.

FIGURE 5 is an end view looking inwardly toward the bottom of the piston of FIGURE 2.

FIGURE 6 is a partial cross-sectional view of the piston of FIGURE 5 taken across the section line 6—6 in FIGURE 5.

FIGURE 7 shows an end view of the bushing structure of FIGURE 2.

FIGURE 8 is a cross-sectional view of FIGURE 7 taken across the section line 8—8 in FIGURE 7.

FIGURE 9 is a cross-sectional view similar to FIGURE 2 showing a second form of the piston trimmer capacitor having a simplified bushing construction.

FIGURE 10 is a plan view of the washer or lug portion of FIGURE 9 used to form the dielectric tube support and adjustment screw support.

FIGURE 11 is a right-hand end view of FIGURE 10.

FIGURE 12 is a cross-sectional view of FIGURE 10 taken across the section line 12—12 in FIGURE 10.

Referring first to FIGURES 1 to 8, there is illustrated therein a piston trimmer capacitor having a nonrotating piston and which comprises a main bushing support 20, which has an enlarged flange 21, which receives a main dielectric tube 22 in the usual manner. Bushing 20 has a tubular extending body portion 23, which is threaded with a thread 24 for mounting purposes, and has a flat 25 thereon in the usual manner. A cavity 26 is formed in the bushing 20, which extends to opening 27 in the plane of flange 21, and then through the remainder of the bushing.

It is to be noted that the portion to the left of flange 21 in FIGURES 2, 7 and 8 is initially a continuous hollow cylinder. In accordance with the present invention, two opposite quadrants of this cylinder are machined in a straddle-milling operation, or the equivalent thereof, so that only sections 30 and 31 remain, which will hereinafter be termed guide rail sections 30 and 31. Because of the straddle-milling technique, guide rail sections 30 and 31 have flat and parallel end surfaces 32–33 and 34–35, where surfaces 32 and 34 are in the same plane which is parallel to and spaced from a second plane containing surfaces 33 and 35. The free ends of guide rails 30 and 31 then have an inwardly tapered section 36, preferably formed prior to the straddle-milling operation.

The guide posts 30 and 31 of the main support bushing 20 are concentric with the dielectric tube 22, with the dielectric tube 22 having metallized coatings 40 and 41 thereon, as shown in FIGURES 2, 3 and 4. Coating 40 is used to permit the soldering of the tube 22 to metallic flange 21, while coating 41 serves as the fixed electrode of the capacitor. A terminal wire 43, or any other suitable terminal means, is then electrically connected to electrode 41, as by soldering or the like, to provide a convenient means for electrical connection to electrode 41. The capacitor movable electrode is formed by the piston 45, which is a conductive piston formed by drawing or any other manner, and which has a bottom section 46. The exterior diameter of piston 45 is closely fitted within the interior of dielectric tube 22 where, however, sufficient clearance is provided to permit axial movement of piston 45 within the tube.

Two openings 47 and 48 are pierced in the bottom wall 46 of the piston which openings generally conform on their exterior diameters to the arcuate shape of guide rails 30 and 31, respectively. In forming openings 47 and 48, it is important that the ends of these openings or slots have flat parallel ends, shown in FIGURE 5, as flat parallel ends 50 and 51 for slot 47 and ends 52–53 for slot 48. The flat ends 50 to 53 receive the corresponding flat ends of guide rails 30 and 31 with a relatively close fit. Thus, the complete guide function for the prevention of rotation of piston 45 is accomplished by the engagement between the flat side surfaces of guide posts 30 and 31 with the corresponding and parallel flat slot ends 50 to 53 of FIGURE 5.

The central portion of bottom 46 of piston 45 is then extruded inwardly, as best shown in FIGURES 5 and 6, to form an inwardly extending oval tube 60, having a major axis lying along the section line 6—6 in FIGURE 5. It is to be noted that the axis of symmetry of slots 47 and 48, shown in FIGURE 5 is represented by line 61 which is perpendicular to the axis of piston 45.

In accordance with an important feature of the invention, the major axis of oval-shaped tube 60 is at about a 10° angle to the line of symmetry 61.

A suitable threading tool is then used which would normally form a circular thread to form threaded portions 62 and 63, best shown in FIGURES 5 and 6, in the opposing and radially flexible surfaces of oval-shaped tubular opening 60. Because of the oval shape of opening 60, its opposing walls, containing threads 62 and 63, deflect inwardly to securely grip an adjustment screw, which is subsequently threaded into thread portions 62 and 63.

The adjustment screw for moving piston 45 is shown in FIGURES 1 to 4 as comprising the threaded shank 70, which has an enlarged flange 71, an annular groove 72 and an enlarged head 73, having a tool-receiving slot 74. The flange 71 is captured behind the inwardly projecting shoulder of opening 27 of bushing 20 to prevent axial movement of adjustment screw 70 to the left. A suitable gasket 72 is captured in groove 72 to seal the interior of the capacitor.

The end of adjustment screw 70 is then formed with a hollow cylinder portion 76 which extends through a central opening in the spring washer 78 and a central opening in a low-friction washer 77. The end of tubular portion 76 is then rolled outwardly, as illustrated in FIGURES 2 and 3, in order to capture the spring washer 78. Thus, the spring washer 78, along with washer 77, and rolled-over portion 76, secure the free end of adjustment screw 70 to the end faces of guide rails 30 and 31, with the right-hand end of adjustment screw 70 captured by the engagement of its flange 71 with the shoulder of opening 27.

Clearly, when the adjustment screw 70 is rotated, the piston 45 will traverse axially along adjustment screw 70 without rotating in view of the guide rails 30 and 31 extending through slots 47 and 48 in the piston bottom 46. Moreover, the oval-shaped portion 60 is pressed inwardly on the adjustment screw, thereby to provide the desired adjustment torque required to rotate the screw 70 in the first instance and to absorb any backlash that would otherwise exist between the threads of adjustment screw 70 and the threaded regions 62 and 63 (FIGURE 5) within the member 60.

FIGURES 9 to 12 illustrate a capacitor of the type shown in FIGURES 1 to 8 where, however, a simplified bushing construction is used. In all other regards, the two structures may be identical and similar numerals in FIGURES 9 to 12 identify components similar to those of FIGURES 1 to 8.

In FIGURE 9, the bushing structure 20 is composed of a simple tubular-shaped conductive body 90 having guide rails 30 and 31 extending from the solid right-hand portion.

In particular, the guide rails 30 and 31 extend from the right-hand surface of a washer or pigtail lug 91. Note that cylinder 90 has an extremely simple shape, having been machined to form the desired guide rails 30 and 31 and being further machined to have a shoulder 92 thereon.

The washer, or pigtail lug 91, as best shown in FIGURES 10, 11 and 12, is composed of a main body portion 93, having a central opening 94 and slots 95 and 96 which pass the guide rails 30 and 31. A pair of lead-type legs 97 and 98 then extend from main body 93 to permit easy electrical connection to the bushing in miniature circuit component applications. The two bushing portions 90 and 91 are simply assembled, as by sliding guide legs 30 and 31 through openings 95 and 96 in member 93 and thereafter brazing or soldering together as shown in FIGURE 9.

The opening 94 has a sufficiently small diameter to capture flange 71 of adjustment screw 70 in the usual manner with the opposite end or free end of adjustment screw 70 connected to the ends of guides 30 and 31, as described in FIGURES 1 to 8.

Note that screw flange 71 and bushing flange 21 engage one another over a conical engaging surface to enhance rotation lead screw accuracy.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows.

I claim:
1. A nonrotating piston trimmer capacitor; said capacitor comprising; a support bushing structure, an adjustment screw, a dielectric tube having an electrode thereon and a piston; said dielectric tube connected to and extending from a portion of said support bushing; said adjustment screw connected to said support bushing and extending into the interior of said dielectric tube; means in said bushing for rotatably mounting said adjustment screw and for axially fixing the position of said adjustment screw; said piston positioned within said dielectric tube and axially movable therein; said bushing structure comprising a main hollow cylindrical body having a cylindrical continuous portion at one end thereof and first and second guide rails arcuate in section symmetrically disposed around the axis of said body extending from said continuous portion and toward the other end of said body; said first and second guide rails comprising approximately 90 degree sections of a cylinder in opposing quadrants; the opposite sides of said first and second guide rails being flat lying in spaced parallel planes; and connecting means for connecting the free end of said adjustment screw to the ends of said guide rails; said connecting means including a spring washer having a central opening therein and a friction washer having an opening therein aligned with said spring washer; said friction washer abutting against the free end surfaces of said first and second guide rails; the free end of said adjustment screw extending through said openings in said washers and connected to said spring washer.

2. A nonrotating piston trimmer capacitor; said capacitor comprising; a support bushing structure, an adjustment screw, a dielectric tube having an electrode thereon and a piston; said dielectric tube connected to and extending from a portion of said support bushing; said adjustment screw connected to said support bushing and extending into the interior of said dielectric tube; means in said bushing for rotatably mounting said adjustment screw and for axially fixing the position of said adjustment screw; said piston positioned within said dielectric tube and axially movable therein; said bushing structure comprising a main hollow cylindrical body having a cylindrical continuous portion at one end thereof and first and second guide rails arcuate in section symmetrically disposed around the axis of said body extending from said continuous portion and toward the other end of said body; said first and second guide rails comprising approximately 90 degree sections of a cylinder in opposing quadrants; the opposite sides of said first and second guide rails being flat lying in spaced parallel planes; said bushing structure comprising a first cylinder and a separate disk-shaped member secured thereto; said disk-shaped member having a central opening and first and second openings surrounding said central opening; said first cylinder having said first and second guide rails formed in a portion thereof; said first and second guide rails extending through said openings in said disk-shaped member with said disk-shaped member perpendicular to the axis of said first cylinder; said dielectric tube connected to said disk-shaped member and surrounding said first and second openings therein.

3. The device as set forth in claim 2 wherein said adjustment screw has a head portion and a flange spaced from said head portion; said flange having a diameter greater than the diameter of said central opening in said disk-shaped member; said head and said flange contained in said first cylinder on one side of said disk-shaped member; said first and second guide rails extending from the opposite side of said disk-shaped member.

References Cited
UNITED STATES PATENTS 3,263,140 7/1966 Lafer et al.
3,273,031 8/1966 Lafer.

ELLIOT A. GOLDBERG, Primary Examiner

U.S. Cl. X.R.
74—424.8; 151—21